United States Patent
Shou et al.

[11] Patent Number: 5,973,538
[45] Date of Patent: Oct. 26, 1999

[54] SENSOR CIRCUIT

[75] Inventors: Guoliang Shou; Kazunori Motohashi; Shengmin Lin; Makoto Yamamoto, all of Tokyo; Toshiyuki Matsumoto; Muneo Harada, both of Hyogo; Takahiko Ooasa, Nara; Yoshihiro Hirota, Kyoto, all of Japan

[73] Assignee: Sumitomo Medal Industries, Ltd., Osaka, Japan

[21] Appl. No.: 08/882,224

[22] Filed: Jun. 25, 1997

[30] Foreign Application Priority Data

Jun. 26, 1996 [JP] Japan .................................. 8-185584

[51] Int. Cl.⁶ ...................................................... G06G 7/42
[52] U.S. Cl. ........................................... 327/344; 327/345
[58] Field of Search ..................................... 327/334, 336, 327/344, 345; 330/84, 107, 294, 295

[56] References Cited

U.S. PATENT DOCUMENTS

| | | | |
|---|---|---|---|
| 4,572,900 | 2/1986 | Wohltjen | 436/151 |
| 5,424,973 | 6/1995 | Shou et al. | 364/807 |
| 5,631,941 | 5/1997 | Shou et al. | 327/333 |
| 5,650,752 | 7/1997 | Shou et al. | 330/84 |
| 5,708,385 | 1/1998 | Shou et al. | 327/334 |
| 5,751,184 | 5/1998 | Shou et al. | 327/311 |
| 5,754,134 | 5/1998 | Shou et al. | 341/163 |

FOREIGN PATENT DOCUMENTS

| | | |
|---|---|---|
| 455 070 | 11/1991 | European Pat. Off. . |
| 707 275 | 4/1996 | European Pat. Off. . |
| 56-166411 | 12/1981 | Japan . |
| 62-189608 | 7/1987 | Japan . |
| 2-22338 | 5/1990 | Japan . |
| 6-180336 | 6/1994 | Japan . |

OTHER PUBLICATIONS

"Sensor Electronics", Kiyoshi Takahashi et al., Shokodo, p. 242, p. 140, pp. 143–145, pp. 127–128, p. 142, 1984.

"Development of Tri–Axial Accelerometers Using Piezoresistance, Electrostatic Capacitance and Piezoelectric Elements", Technical Digest of the 13th Sensor Symposium, pp. 169–172, 1995.

"An Mos Switched–Capacitor Readout Amplifier For Capacitive Pressure Sensors", Y.E. Park and K. D. Wise, pp. 380–384, IEEE, 1983.

"A Versatile Super High Sensitivity and Low Drift Capacitive Instrumentation Amplifier by DATSH Technology", H. Okada et al., Technical Digest of the 13th Sensor Symposium, pp. 209–212, 1995.

Ernst Habekotté et al., "A Smart Digital–Readout Circuit for a Capacitive Microtransducer", *IEEE Micro*, 1984, pp. 44–54.

*Primary Examiner*—Tuan T. Lam
*Attorney, Agent, or Firm*—Pillsbury Madison & Sutro LLP

[57] ABSTRACT

A small sensor circuit with reducible electric power consumption is formed by connecting inverting amplifiers comprised of CMOS inverters connected in an odd number of stages, in series to guarantee the linearity of the relationship between inputs and outputs, and connecting an impedance as a sensor between the inputs and outputs, or to an input.

7 Claims, 11 Drawing Sheets

SENSOR CIRCUIT

FIELD OF THE INVENTION

The present invention relates to sensor circuits, particularly for electrically detecting characteristic changes as capacitance values or resistance values.

BACKGROUND OF THE INVENTION

A differential-type sensor, such as a differential transformer, can possess high sensitivity using contrary outputs of elements. For example, a sensor using strain gauges can generate improved output when those gauges are attached at positions where strains are generated in a reverse direction. Such sensor output is often used after amplification by operational amplifier.

Recently, various and extensive sensor information must be processed in computer control of vehicular fuel consumption and ecologically to reduce electric power consumption. A sensor circuit that is small and uses a reduced amount of electric power for processing signals and realizing high sensitivity is in demand. (Reference: "Sensor Electronics", Kiyoshi TAKAHASHI, et al., Shokodo, 1984).

FIG. 24 shows a capacitive sensor circuit of a conventional sensor as disclosed in Japanese Patent Laid-Open Publication No. 56-166411, in which an integrating circuit is formed by resistor R1 and capacitive sensor C1. A pulse is generated, which corresponds to the change of C1 is counted by counter CNT, and the output of CNT is converted into a voltage value by the integrating circuit.

FIG. 25 shows another capacitive sensor circuit of a conventional sensor as disclosed in Japanese Patent Publication No. 2-22338, in which a predetermined pulse is input to the first integrating circuit including resistor R2 and capacitive sensor C2, and to the second integrating circuit including resistor R1 and capacitor C1, the difference between the two is output as a voltage signal, and the change of C2 is detected at the output.

The above sensor circuits consume a lot of electric power because the circuits constantly and invariably generate pulses. Also, the circuits need complicated signal processing circuits like counter circuits, differential amplifying circuits, and pulse generating circuits. The resulting large circuit size makes it difficult to combine these circuits with sensors.

SUMMARY OF THE INVENTION

The present invention solves the above problems and has an object to provide a small sensor circuit for reducing electric power consumption.

A sensor circuit according to the present invention uses a pair of resistors or a pair of capacitors, with contrary characteristics given to a pair of impedances. Each pair of impedances is connected to the input of a CMOS inverting amplifier with an odd number of inverters and to the midpoint between its input and output. This kind of connection gives a closed loop-gain to the relationship between the input and the output of the CMOS inverting amplifier according to the impedance changes.

Otherwise, one of the pair of impedances is connected to a CMOS inverting amplifier made of an odd number of inverters including feedback impedance to combine the output of the CMOS inverting amplifier and another impedance by capacitive coupling.

DETAILED DESCRIPTION OF CURRENTLY PREFERRED EMBODIMENTS

Hereinafter, a sensor circuit according to the present invention is described with reference to the attached drawings.

Figure 1:
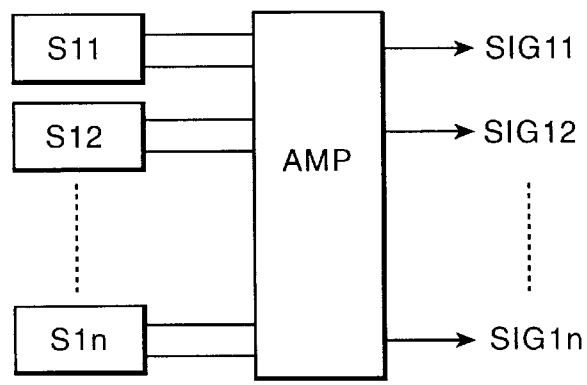
FIG. 1 shows a conceptual diagram of a sensor circuit according to the present invention.

In FIG. 1, the sensor circuit includes amplifying circuit AMP, to which a plurality of sensors S11 to S1$n$ are connected, and from which output signals SIG11 to SIG1$n$ corresponding to each sensor are output.

Figure 2:
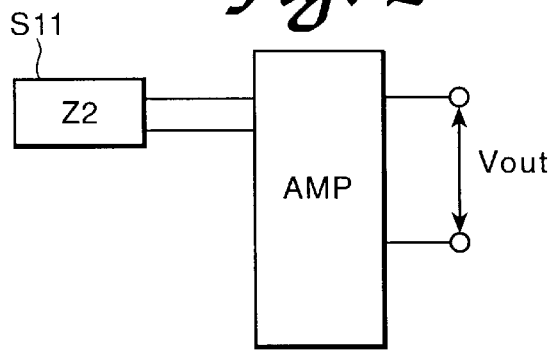
FIG. 2 shows a block diagram of a sensor circuit.

The sensors can be one of two kinds. FIG. 2 shows the first type, sensor S11 with impedance Z2 connected to AMP. Output voltage Vout, corresponding to the characteristic change of Z2, is output from AMP.

Figure 3:
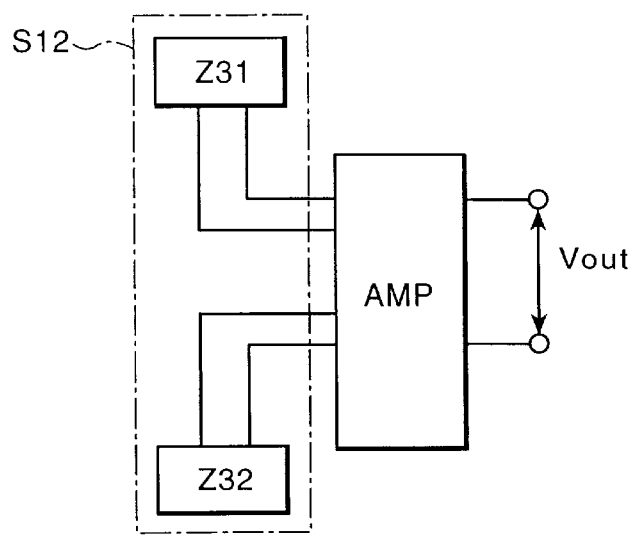
FIG. 3 shows another block diagram of a sensor circuit.

FIG. 3 shows a second type of sensor S12 with a pair of impedances Z31 and Z32, parallelly connected to AMP. To each of this pair, a contrary characteristic change is given. High-accuracy detection is possible by comparing the contrary characteristic changes, and the detected result is output from AMP as Vout.

Figure 20:
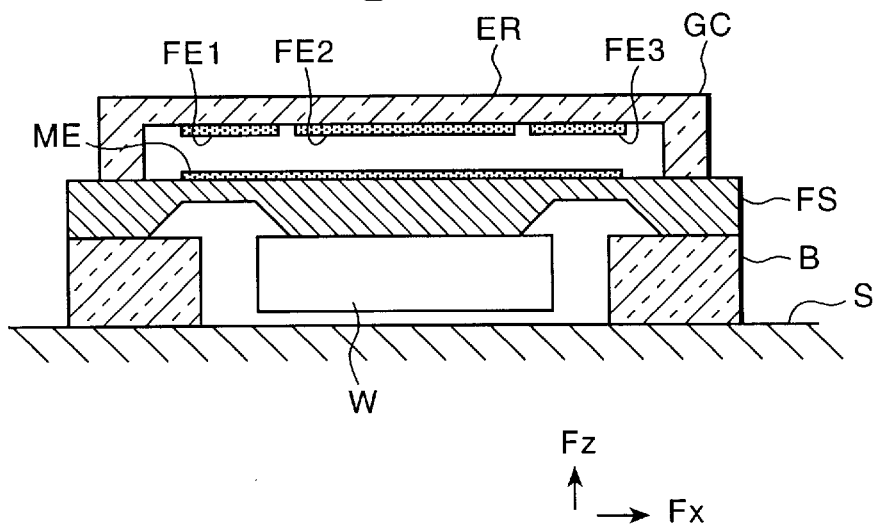
FIG. 20 shows a vertical section of a sensor circuit.
Figure 21:
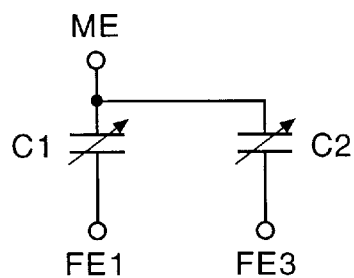
FIG. 21 shows a circuit equivalent to the sensor circuit in FIG. 20.

For example, contrary characteristic changes occur in the cases below, (1) A strain gauge is added to each compressing and tensing side of a leaf-spring detector (p. 242 in Takahashi, "Sensor Electronics");

(2) A sensing system of strain gauges is attached on the center and edge portions of a diaphragm to detect pressure, (p140 in Takahashi);

(3) A Linear Variable Differential Transformer (p143 to p145 in Takahashi);

(4) A sensing system with a pair of Hall elements placed in a straight array which measures the change in resistance by moving a permanent magnet attached to the object to be measured (p127 and 128 in Takahashi);

(5) A sensing system with electrodes arrayed on both sides of the diaphragm of a high-accuracy capacitive pressure gauge in which the change of the capacity between each electrode and the diaphragm is detected by a half-bridge circuit (p142 in Takahashi);

(6) An acceleration sensor in FIG. 20 in "Development of Triaxial Accelerometers Using Piezoresistance, Electrostatic Capacitance and Piezoelectric Elements", K. OKADA, Technical Digest of the 13$^{th}$ Sensor Symposium, 1995, p169 to 172. In this sensor, fixed electrodes FE1, FE2, FE3 are located facing movable electrode ME. ME is deformed according to the displacement of weight W caused by acceleration, and the capacitance value between each fixed electrode and the movable electrode is measured. The equivalent circuit of an acceleration sensor is a parallel changeable capacitor shown in FIG. 21, in which changeable capacitor C1, including movable electrode ME and fixed electrode FE1, and changeable capacitor C2, including ME and fixed electrode FE3, are parallelly connected. When acceleration generates in the rental in the array direction of FE1 and FE3 (Fx direction in FIG. 20), contrary capacitance changes occur in C1 and C2 to increase the capacitance value of one of the two and decrease that of the other. In FIG. 20, S and FS are silicon substrates, B is a glass leg, and GC is a glass cover.

Figure 22:
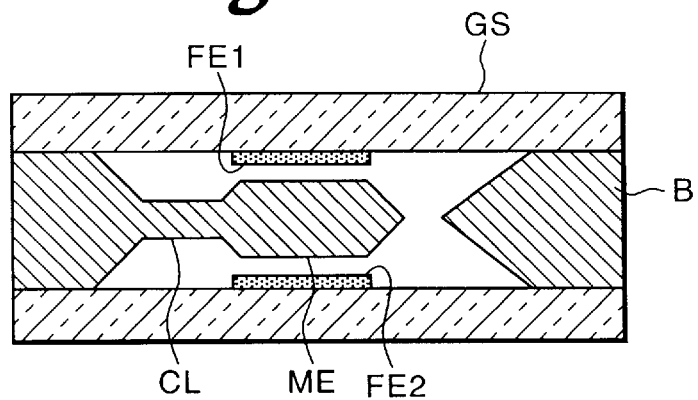
FIG. 22 shows a vertical section of another sensor circuit.
Figure 23:
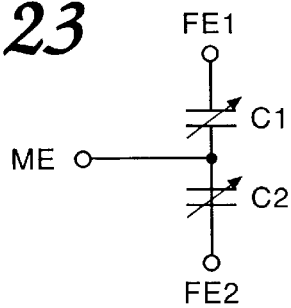
FIG. 23 shows a circuit equivalent to the sensor circuit in FIG. 22.
Figure 24:
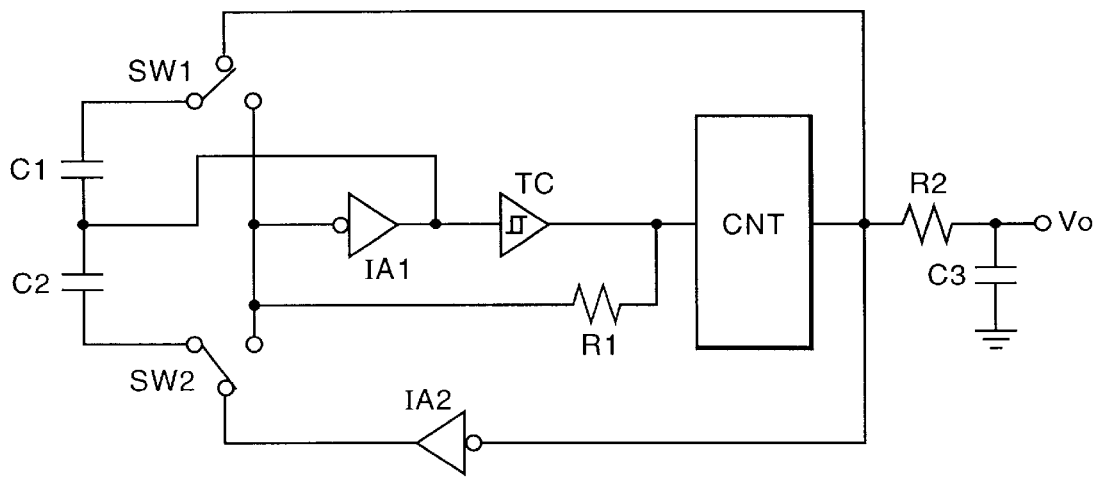
FIG. 24 shows a conventional sensor circuit.
Figure 25:
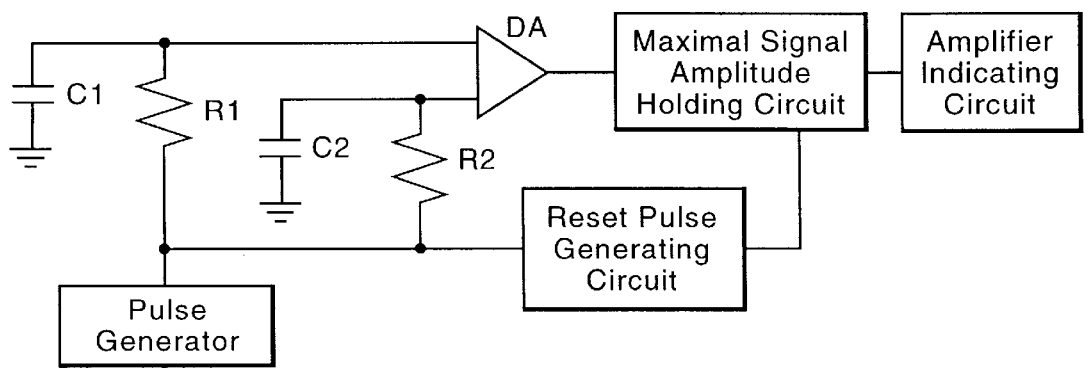
FIG. 25 shows another conventional sensor circuit.

(7) In an acceleration sensor in FIG. 22 of the above reference, movable capacitors are formed between the movable electrode ME set at the tip old cantilever CL and each fixed electrode FE1, FE2, respectively, set above and below ME. As shown in FIG. 23, the equivalent circuit of an acceleration sensor is a serial circuit including changeable capacitors C1, C2. Contrary capacitance changes occur in C1, C2 by displacement of ME caused by upward anal downward acceleration in FIG. 22. In FIG. 22, B is a silicon base and GS is a glass cover.

Figure 4:
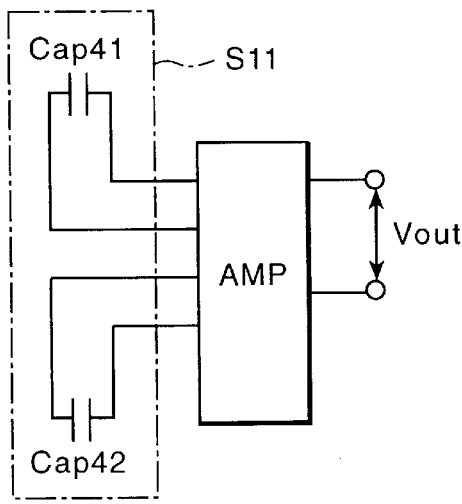
FIG. 4 shows an example of the circuit in FIG. 3.
Figure 5:
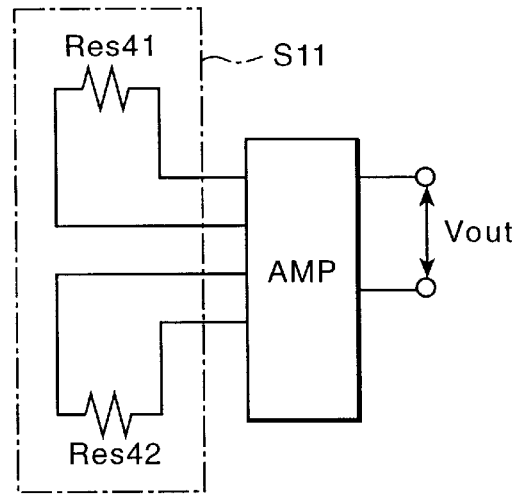
FIG. 5 shows another example of the circuit in FIG. 3.

The impedances in FIG. 3 are a pair of capacitors Cap41 and Cap42 as shown in FIG. 4, or a pair of resistors Res41 and Res42 as shown in FIG. 5.

Figure 6:
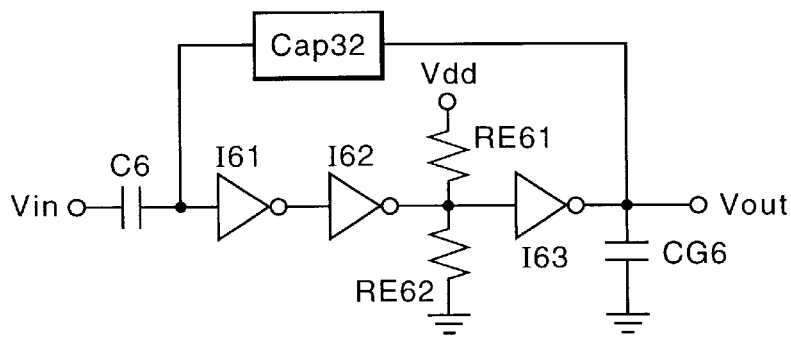
FIG. 6 shows a first embodiment of a sensor circuit.

FIG. 6 shows the structure of a first embodiment of the sensor circuit of the present invention using a capacitor as the impedance in FIG. 2. In FIG. 6, capacitor Cap32 is connected as a capacitive sensor located between the input and output of an inverting amplifier, which includes CMOS inverters I61 to I63 in a three-stage array. Input capacitor C6 is connected to the input of the inverting amplifier. Input voltage Vin is connected to C6, and output Voltage Vout is output from I63. The inverting amplifier has good linear characteristics in the relationship between input and output due to the inclusion of a feedback loop and a high open loop-gain of I61 to I63. Assuming the threshold voltage of the inverting amplifier is Vb, the relationship between input and output is expressed by formula (1):

$$Vout - Vb = -\frac{C6}{Cap32}(Vin - Vb) \quad (1)$$

Figure 7:
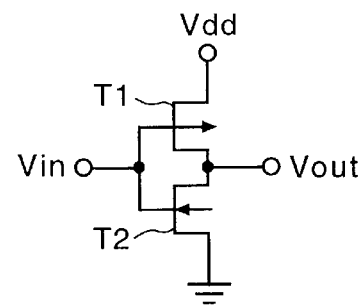
FIG. 7 shows a CMOS inverter.

CMOS inverters I61 to I63 are designed as in FIG. 7. The drain of n-type MOS transistor T2 is connected to the drain of p-type MOS transistor T1, a common input voltage Vin is connected to the gates T1, T2, and high and low voltage are connected, respectively, to the sources of T1 and T2. Output voltage out of the CMOS inverters is output from the drains of T1 and T2.

Figure 8:
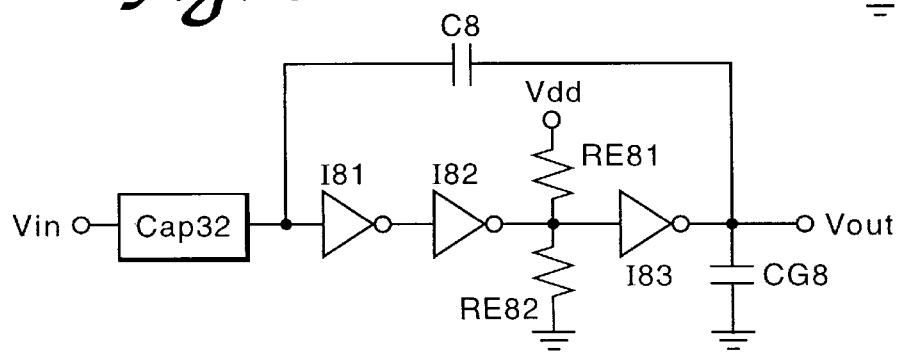
FIG. 8 shows a second embodiment of a sensor circuit.

FIG. 8 shows a second embodiment of a sensor circuit of the present invention with a capacitor serving as an impedance. In FIG. 8, feedback capacitor C8 is connected between the input and output of the inverting amplifier, which includes CMOS inverters I81 to I83 in three-stage array. Capacitor Cap32 is connected to the input of the inverting amplifier as a capacitive sensor. Input voltage Vin is connected to Cap32, and output voltage Vout is output from I83. Similar to the circuit in FIG. 6, the relationship between the input and output in the inverting amplifier has good linearity. Assuming the threshold voltage of the CMOS inverters to be Vb, the relationship between the input and output is expressed in formula (2):

$$Vout - Vb = -\frac{Cap32}{C8}(Vin - Vb) \quad (2)$$

Figure 9:
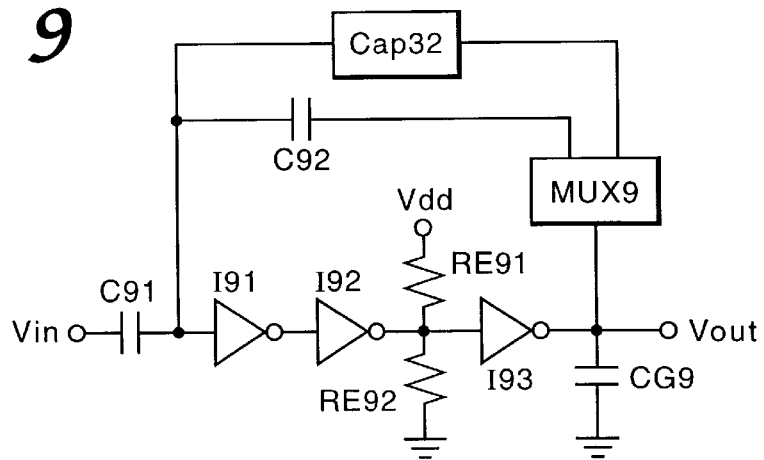
FIG. 9 shows a third embodiment of a sensor circuit.

FIG. 9 shows a third embodiment of the sensor circuit of the present invention with reference capacitor C92 added to the structure in FIG. 6. Input capacitor C91 is independently connected to the input of the inverting amplifier, and reference capacitor C92 is connected in parallel to Cap32. Cap32 and C92 are connected to the output of the inverting amplifier through multiplexer MUX9. Cap32 is selectively connected to the output of the inverting amplifier, when a usual sensor is activated, and C92 is selectively connected to the output of the inverting amplifier to confirm the reference condition. Although MUX9 may be located at the input of the inverting amplifier, the output of the inverting amplifier is the preferable connecting point when the influence on C91 is considered. When equation (1) is not effective, for example, because of the stored electric charge in Cap32, the measurement can be corrected by cutting off Cap32 and connecting C92. This results in constant values of output voltage due to the known value of capacitor.

Figure 10:
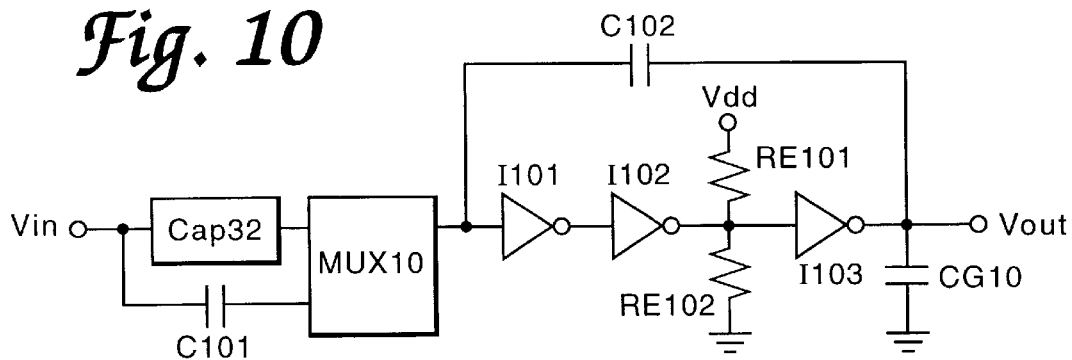
FIG. 10 shows a fourth embodiment of a sensor circuit.

FIG. 10 shows a fourth embodiment of the sensor circuit of the present invention in which the reference capacitor C101 is added to the structure in FIG. 8. Feedback capacitor C102 is connected between the input and output of the inverting amplifier which includes CMOS inverters I101 to I103 in a three-stage array, and reference capacitor C 101 is connected to the input of the inverting amplifier through MUX10 in parallel with Cap32. Cap32 is selectively connected to the inverting amplifier, when a usual sensor is activated, and C101 is selectively connected to the inverting amplifier to confirm the reference condition. When equation (2) is not effective, for example, because of the electric charge in Cap32, the measurement can be corrected by cutting off Cap32 and connecting C101. This generates constant value of output voltage due to the known value of capacitor.

Figure 11:
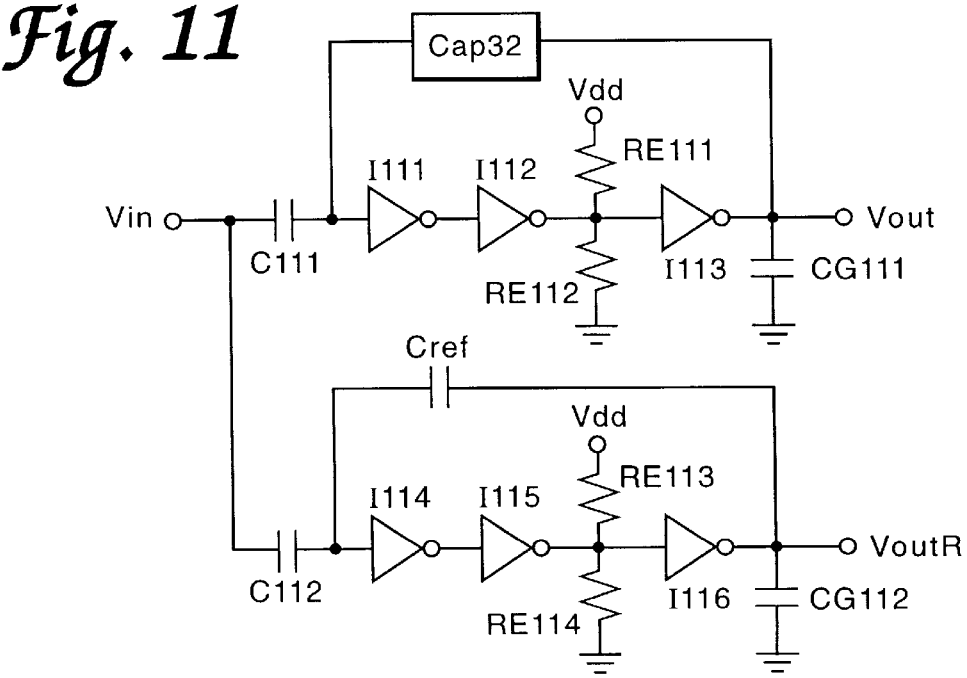
FIG. 11 shows a fifth embodiment of a sensor circuit.

In FIG. 11, in a fifth embodiment, the circuit in FIG. 6 is set in pairs, where one feedback capacitor is replaced by a reference capacitor. In the first circuit, the inverting amplifier, which includes CMOS inverters I111 to I113 in a three stage-array, is connected to capacitive sensor Cap32, and input capacitor C111 is connected to the input of the inverting amplifier. In the second circuit, the input and output of the inverting amplifier, which includes CMOS inverters I114 to I116 in a three-stage array, are connected to reference capacitor Cref, and input capacitor C112 is connected to the input of the inverting amplifier. Common input voltage Vin is connected to input capacitors C111, C112. The first circuit's output voltage Vout is a sensor-measured result of the sensor, and the second circuit's output voltage VoutR is the reference voltage of the reference capacitor. Measurement of the sensor can be executed through constant observation of the reference output in this structure.

Figure 12:
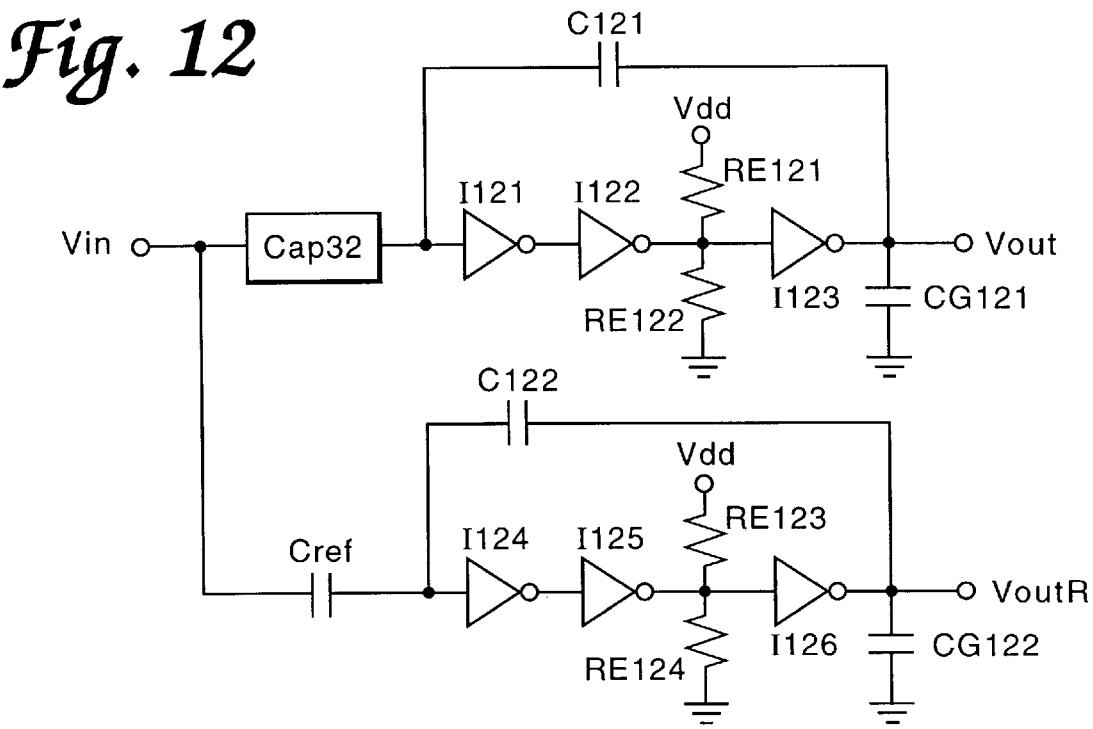
FIG. 12 shows a sixth embodiment of a sensor circuit.

In FIG. 12, in a sixth embodiment, the circuit in FIG. 8 is set in pairs, where one input capacitor is replaced by a reference capacitor. In the first circuit, the inverting amplifier, which includes CMOS inverters I121 to I123 in a three-stage array, has a feedback capacitor C121, and capacitor Cap32 is connected to the input of the inverting amplifier as a capacitive sensor. In the second circuit, the input and output of the inverting amplifier, which includes CMOS inverters I124 to I126 in a three-stage array, has a feedback capacitor C122, and reference capacitor Cref is connected to the input of the inverting amplifier. The common input voltage Vin is connected to the input of capacitors Cap32 and Cref. The first circuit's output voltage Vout is a sensor-measured result, and the second circuit's output voltage VoutR is the reference voltage of the reference capacitor. Measurement can be executed through constant observation of the reference outputs in this structure.

Figure 13:
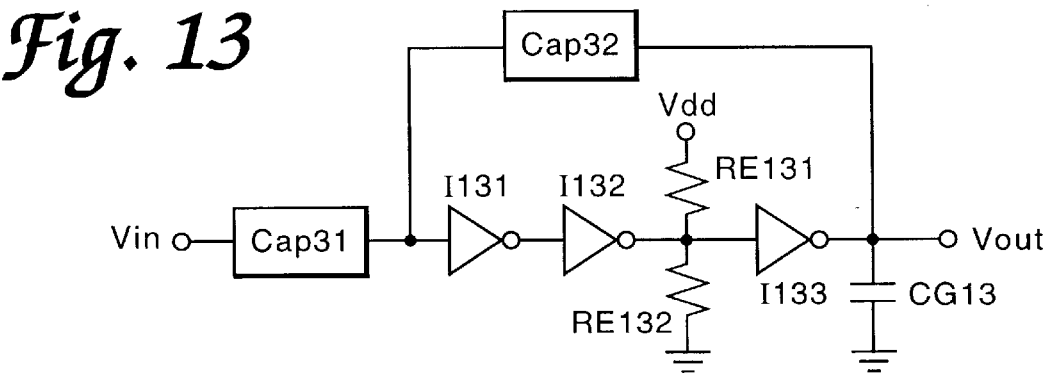
FIG. 13 shows a seventh embodiment of a sensor circuit.

FIG. 13 shows a seventh embodiment of the sensor circuit of the present invention which uses capacitive sensors Cap31, Cap32, the input and output of the inverting amplifier, which includes CMOS inverters I131 to I133 in a three-stage array, are connected to Cap32, and Cap31 is connected to the input of the inverting amplifier. Assuming that the input voltage of Cap31 is Vin, and the output voltage of the inverting amplifier is Vout, the relationship between the input and output is expressed in formula (3):

$$Vout - Vb = \frac{Cap31}{Cap32}(Vin - Vb) \quad (3)$$

Formula (3) stipulates the output voltage is proportional to the ratio of Cap31 to Cap32. When Cap31 and Cap32 change contrarily, the change is output through amplification.

Figure 14:
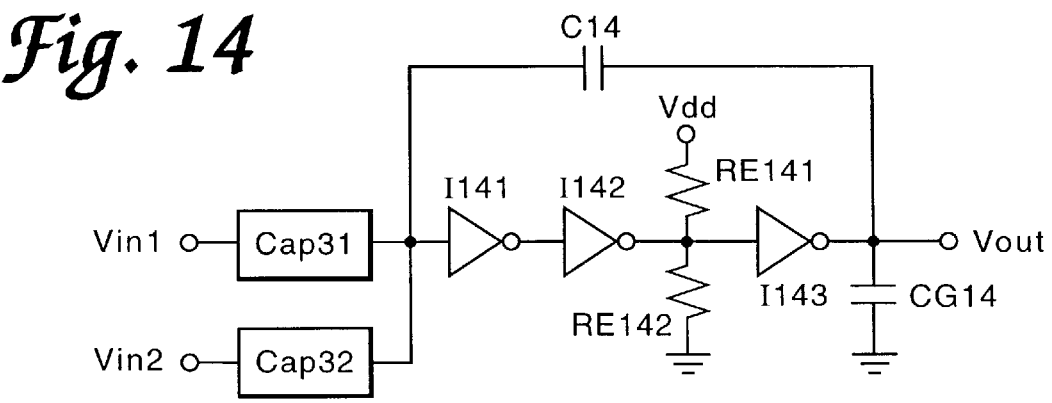
FIG. 14 shows a eighth embodiment of a sensor circuit.

FIG. 14 shows an eighth embodiment of the sensor circuit of the present invention which uses two capacitive sensors Cap31, Cap32, the input and output of the inverting amplifier, which includes CMOS inverters I141 to I143 in a three-stage array, are connected to feedback capacitor C14, and Cap31 and Cap32 are parallelly connected to the input of the inverting amplifier. Assuming that the input voltage of Cap31 is Vin1, that of Cap32 is Vin2, and the output voltage of the inverting amplifier is Vout, the relationship between the inputs and output of this circuit is shown in formula (4):

$$Vout - Vb = -\frac{Cap31 \cdot (Vin1 - Vb) + Cap32 \cdot (Vin2 - Vb)}{C14} \quad (4)$$

Formula (4) stipulates the output voltage is proportional to the sum of Cap31 and Cap32, which are multiplied by their input voltages, respectively. This will be effective to integrate the dispersed measurement values.

Figure 15:
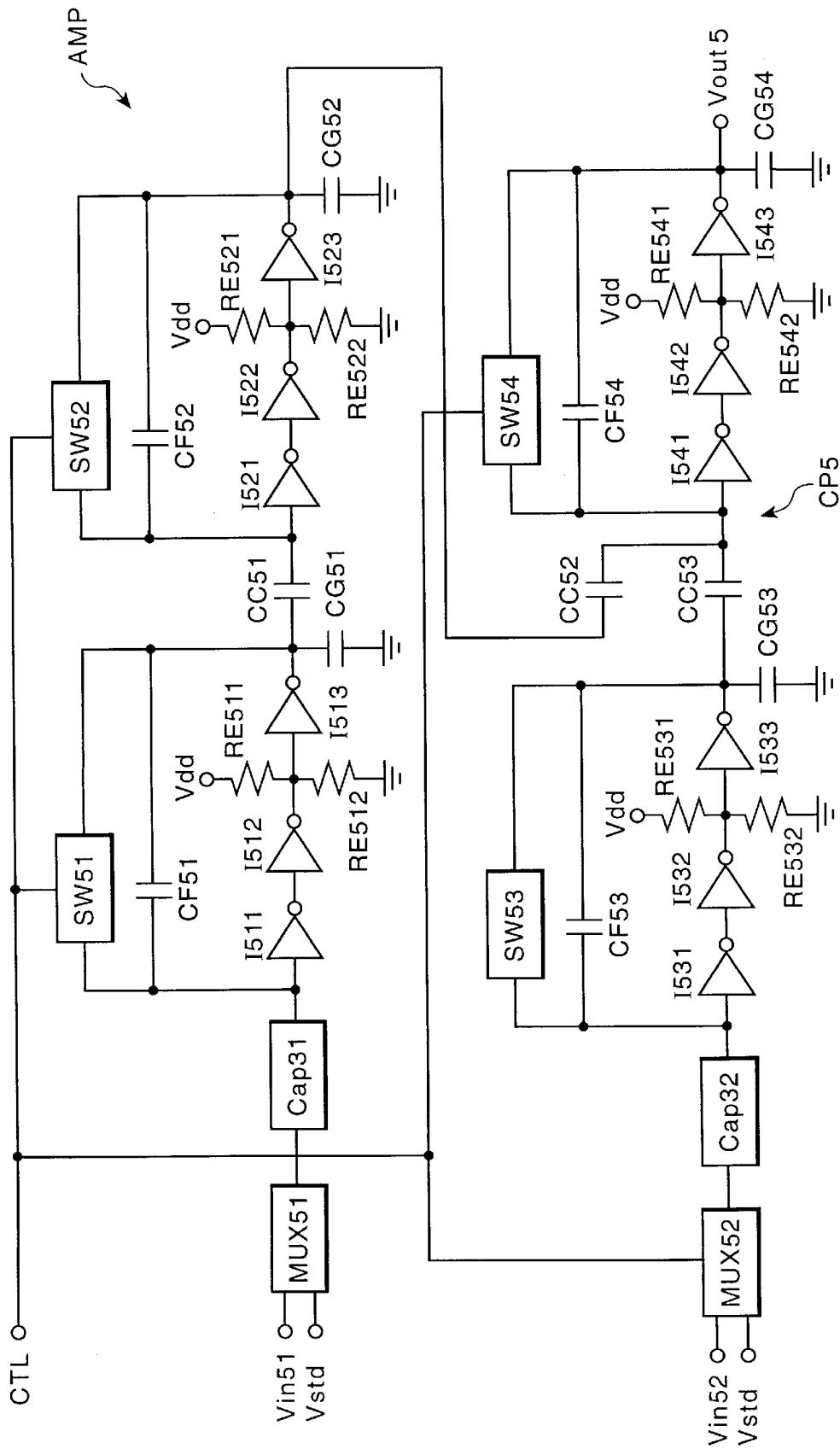
FIG. 15 shows a ninth embodiment of a sensor circuit.

In FIG. 15, in the ninth embodiment, Cap31 and Cap32 are connected to the inputs of CMOS inverters I511 to I513, and I531 to I533, respectively, which are in a three-stage array. The output of I513 is input to I511 through feedback capacitor CF51 so that the inverting output of Cap31 is generated with good linearity at the output of I513 due to the high open loop-gains of I511 to I513. The output of I533 is input to I533 through feedback capacitor CF53 so that the inverting output of Cap32 is generated with good linearity at the output of I533 due to the high open loop-gains of I531 to I533.

Through coupling capacitor CC51, the output of I513 is connected to CMOS inverters I521 to I523 in three stages. The output of the CMOS inverters is input to I521 through feedback capacitor CF52. The output of I513 is again inverted by it, asked so the output of Cap31 reverts to a state of non-conversion. The outputs of I523 and I533 are respectively connected to capacitors CC52 and CC53, whose outputs are added and make capacitive coupling CP5. CC52 and C53 form a capacitive coupling CP5 which combines an output of the second inverting amplifier and an output of the third inverting amplifier.

The output of CP5 is connected to the input of CMOS inverters I541 to I543 in a three-stage array, and their output is input to I541 through feedback capacitor CF54 so that the inverting output of CP5 is generated with good linearity at the output of I543 by the high open loop-gains of I541 to I543.

Assuming that the input voltages of Cap31 and Cap32 are Vin51 and Vin52, respectively, and the threshold voltage of CMOS inverter is Vb, output voltage Vout5 of the output of I543 is expressed by formula (5):

$$Vout5 - Vb = \\ -\frac{Cap31 \cdot CC51 \cdot CC52}{CF51 \cdot CF52 \cdot Cf54}(Vin51 - Vb) + \frac{Cap32 \cdot CC53}{CF53 \cdot CF54}(vin52 - Vb) \quad (5)$$

The conditions below are based on the capacitance ratio and the input voltage:

$$CC51 = CF52 \quad (6)$$

$$CC52 = CC53 = CF54/2 \quad (7)$$

$$CC51 = CF53 \quad (8)$$

$$Vin51 = Vin52 = V \quad (9)$$

Voltage V in formula (9) has a known value of voltage supplied externally. When CF51=CF53=C0, formula (5) is changed into formula (10):

$$Vout5 - Vb = \frac{1}{2C0}(V - Vb)(Cap32 - Cap31) \quad (10)$$

Therefore, the changes of Cap32 and Cap31 are detected as their difference as shown in formula (11). When contrary changes occur to them, the changed quantity can be detected by amplifying it twice. The gain can be appropriately adjusted by changing the values C0 and V:

$$Cap32 - Cap31 = \frac{2C0(Vout5 - Vb)}{V - Vb} \quad (11)$$

In the above circuits, the outputs of the last stages (output stages) of each three-stage CMOS inverters I63 (see FIG. 6), I83 (see FIG. 8), I93 (see FIG. 9), I103 (see FIG. 10), I113 (see FIG. 11), I116 (see FIG. 11), I123, I126 (see FIG. 12), I133 (see FIG. 13), I143 (see FIG. 14), I513 (see FIG. 15), I523, I533 and I543, are respectively connected to the following grounded capacitors serving as low-pass filters: CG6, CG8, CO9, CG10. CG111, CG112, CG121, CG122, CG13, CG14, CG51, CG52, CG53 and CG54. The following balancing resistors to control gains RE61 and RE62, RE81 and RE82, RE91 and RE92, RE101 and RE102, RE111 and RE112, RE113 and RE114, RE121 and RE122, RE123 and RE124, RE131 and RE132, RE141 and RE142, RE511 and RE512, RE521 and RE522, RE531 and RE532, and RE541 and RE542 are connected to the outputs of the intermediate stages: I62, I82, I92, I102, I112, I115, I122, I125, I132, I142, I512, I522, I532, and I542, respectively. RE511, RE521, RE531 and RE541 are connected to supply voltage Vdd, and RE512, RE522, RE532 and RE542 are grounded. These structures prevent oscillation within the inserting amplifying circuits including feedback circuits.

Both the inputs and outputs of CF51, CF52, CF53, and CF54 are connected to switches SW51, SW52, SW53, SW54, respectively, can open and close.

Reference voltage Vstd can be input to Cap31 and Cap32, instead of input voltages Vin51 and Vin52 through multiplexers MUX51 and MUX52, respectively. It is possible to reduce the residual charge in Canal and Cap32 by closing the switches at the same time and connecting Vstd Cap31 and Cap32. As the residual charge generates an offset voltage in the output voltage, the refreshment through charge reduction prevents the outputs from losing accuracy. Control signal CTL is set, for example, to 1 (high level) for refreshment and to 0 (low level) for normal measurement.

Figure 16:
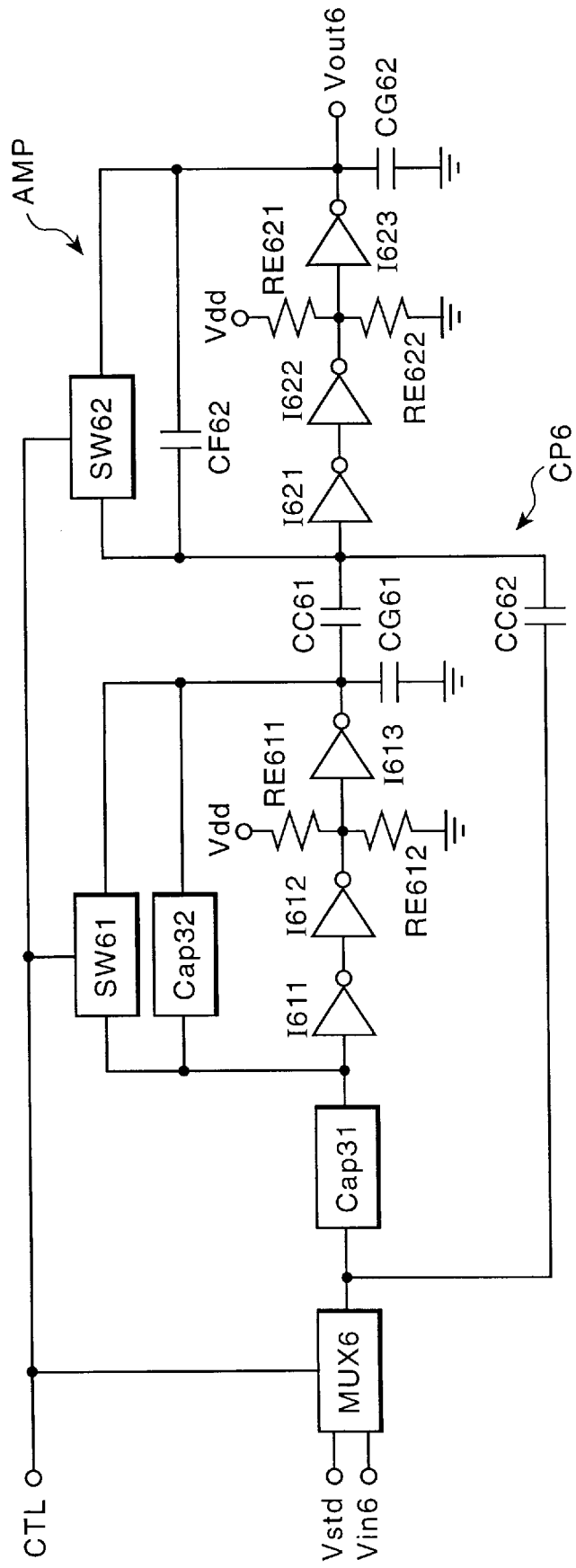
FIG. 16 shows a tenth embodiment of a sensor circuit.

FIG. 16 shows a tenth embodiment of the sensor circuit of the present invention in which in amplifying circuit AMP, Cap31 is connected to the input of CMOS inverters I611 to I613 in a three-stage array, and Cap32 is connected between the output of I613 and the input of I611 as a feedback capacitor. Input voltage Vin6 is input to Cap31 through multiplexer MUX6, and the inverting output of Vin6 is generated at the output of I613 with linear characteristics. CMOS inverters I621 to I623 in a three-stage array are connected to the output of I613 through coupling capacitor CC61. The output of I623 is input to I621 through feedback capacitor CF62. The output of I613 is re-inverted, and the output of I623 reverts to a non-inverted state.

The output of MUX6 is connected to I621 through coupling capacitor CC62. Consequently, the inverting output of I613 and Vin6 are added, and when the threshold voltage of the COOS inverters is Vb, Vout6 as the output of I623 is expressed in formula (12):

$$Vout6 - Vb = \frac{\frac{Cap31}{Cap32} \cdot CC61 - CC62}{CF62}(Vin6 - Vb) \quad (12)$$

Formula (13) shows the condition on the capacitance ratio:

$$CC61=CC62=CF62 \quad (13)$$

To Vin6, the known input value of voltage is supplied similar in formula (10).

$$Vin6=V \quad (14)$$

Therefore, formula (12) is translated to formula (15):

$$Vout6 - Vb = \left(\frac{Cap31}{Cap32} - 1\right)(V - Vb) \quad (15)$$

As shown in formula (15), the changes of Cap32 and Cap31 are detected as the ratio between them. When contrary changes occur to them, the changed quantity can be detected by amplifying it twice. The gain can be appropriately adjusted according to the ratio by setting $CC61 \neq CF62$ or by changing the value of V.

Also in this embodiment, grounded capacitors CG61, CG62 for preventing oscillation and balancing resistors RE611, RE612, RE621 and RE622 are included. Between the inputs and outputs of Cap32 and CF62, refreshing switches SW61 and SW62 are connected, respectively. Vstd is input to MUX6 and then, sent to Cap31 to be refreshed. As Vstd=Vb, the input of I611 is also Vb, and Cap31 is refreshed. The refreshing process is executed by control signal CTL, as shown in FIG. 15.

Through Vstd in FIG. 16 is generated outside of AMP or the integrated circuit, the voltage Vb in AMP can be used because Vstd is set equal to Vb.

Figure 17:
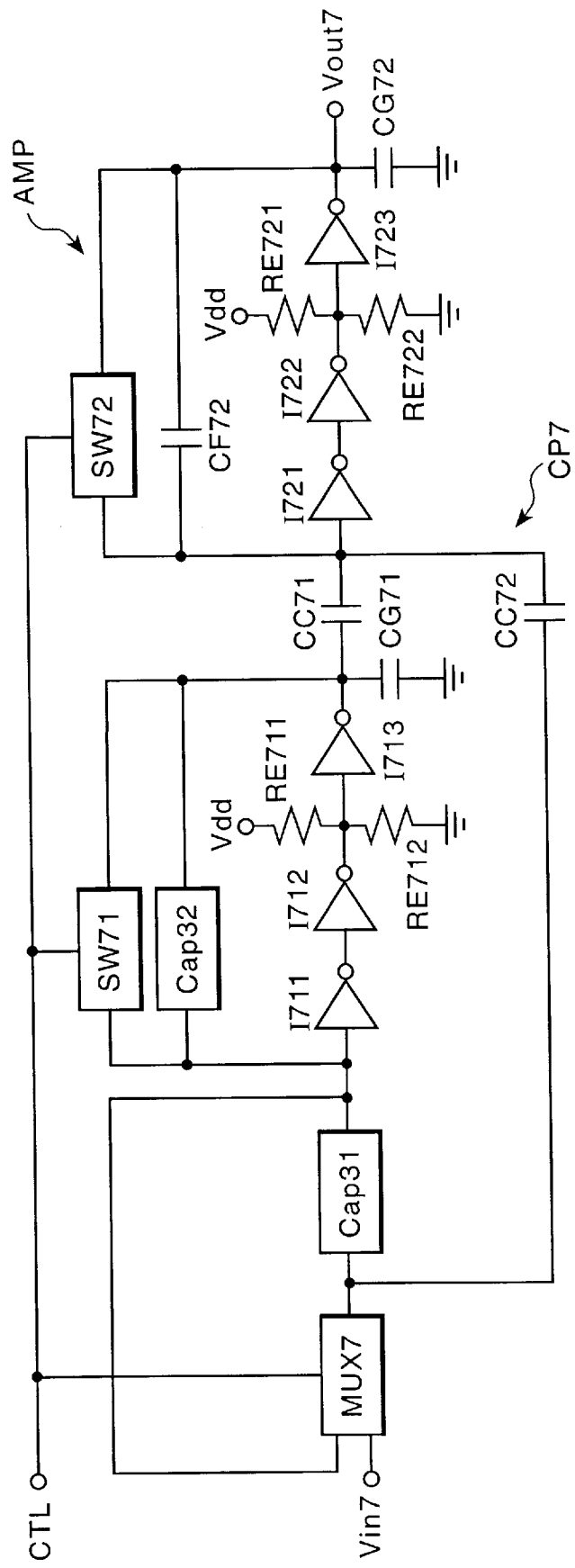
FIG. 17 shows a eleventh embodiment of a sensor circuit.

FIG. 17, in the eleventh embodiment, shows a change in Ystd as a variation of FIG. 16. All components numbered 6 in FIG. 16 are renumbered 7 in FIG. 17. In FIG. 17, an input of I711 (an output Of Cap31) is connected to the input of multiplexer MUX7, instead of Vstd. It short-cuts Cap31, so that Cap31 can be refreshed. Not using Vstd from outside avoids the need far a circuit to generate it.

Figure 18:
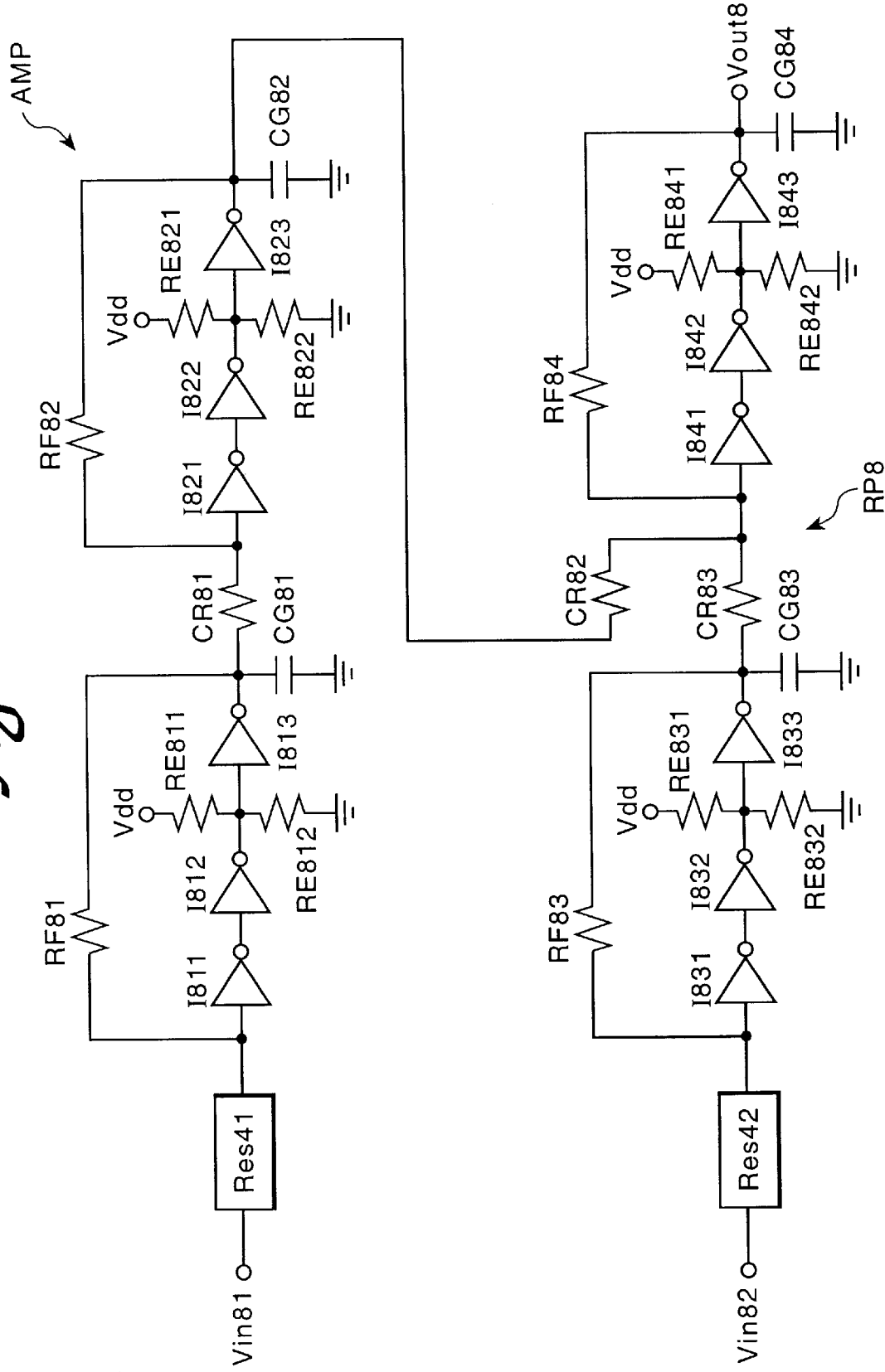
FIG. 18 shows a twelfth embodiment of a sensor circuit.

FIG. 18 shows a twelfth embodiment, of the sensor circuit of the present invention in which the amplifying circuit AMP uses resistors Res41 and Res42 as impedances.

In FIG. 18, Res41 is connected to the input of CMOS inverters I811 to I813 in a three-stage array and Rest 42 is connected to the input of CMOS inverters I831 to I833 in similar array. The output of I813 is input to I811 through feedback resistor RF81, and the inverted output of Res41 is generated with good linearity at the output of I813 due to the high open loop-gains of I831 to I833.

CMOS inverters I821 to I823 in a three-stage array are connected to the output of I813 through coupling resistor CR81, and the output of I823 is input to I821 through feedback resistance RF82. By such a structure, the output of I813 undergoes inversion again and so the output of Res41 is reverts to a non-inverted state. The output of I823 and I833 is, respectively, connected to resistors CR82 and CR83, whose output is added and make resistive coupling RP8. CR82 and CR83 form resistive coupling RP8 which combines an output of the second inverting amplifier and an output of the third inverting amplifier.

The outputs of RP8 are input to CMOS inverters I841 to I843 in a three-stage array. The output of the CMOS inverters is input to I841 through feedback resistor RF84. Accordingly, the inverting output of RP8 is generated with good linearity at the output of I843 due to high loop-gains of I841 to I843.

Assuming the input voltages of Res41 and Res42 to be Vin81 and Vin82, respectively, and the threshold voltage of the CMOS inverter to be Vb, output Vout8 of I843 is expressed by formula (16):

$$Vout8 - Vb = \qquad (16)$$
$$\frac{RF81 \cdot RF82 \cdot R84}{Res41 \cdot CR81 \cdot CR83}(Vin81 - Vb) + \frac{RF83 \cdot RF84}{Res42 \cdot CR82}(Vin82 - Vb)$$

The equations, below are conditions on the capacitance ratio and the input voltage:

$$CR81=RF82 \quad (17)$$

$$CR82=CR83=2RF84 \quad (18)$$

$$RF81=RF83 \quad (19)$$

$$Vin81=Vin82=V \quad (20)$$

When RF81=RF83=R0, formula (16) is changed into formula (21):

$$Vout8 - Vb = 2R0(V - Vb)\left(\frac{1}{Res42} - \frac{1}{Res41}\right) \quad (21)$$

Changes of Res41 and Res42 are detected as the difference of their reciprocal numbers as shown in formula (22).

When contrary changes occur, the changed quantity can be detected by amplifying it twice. The gain can be adjusted by setting the values of R0 and V.

$$\frac{1}{Res42} - \frac{1}{Res41} = \frac{Vout8 - Vb}{2R0(V - Vb)} \quad (22)$$

Similar to the above embodiments, oscillation is prevented by connecting each grounded capacitor CG81, CG82, CG83 and CG84 to the last stage of each three stages of CMOS inverter, and connecting each balancing resistor RE811 and RE812, RE821 and RE822, RE831 and RE832, and RE841 and RE842 to the second stage. In a circuit having a resistor as an elementary component, refreshment is not requisite because no residual charge is generated.

Figure 19:
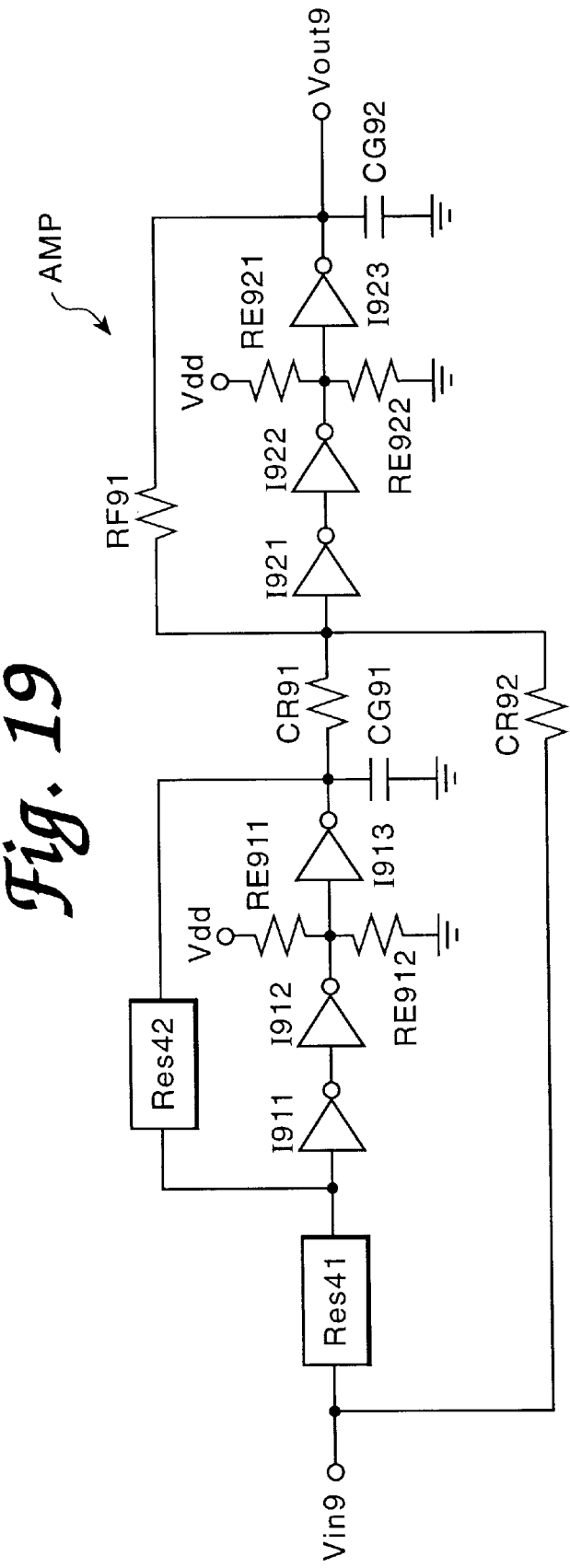
FIG. 19 shows a thirteenth embodiment of a sensor circuit.

FIG. 19 shows a thirteenth embodiment of the sensor circuit of the present invention in which in the amplifying circuit AMP, Res41 is connected to the input of CMOS inverters I911 to I913 in a three-stage array, and Res42 is connected between the output of I913 and the input of I911 as a feedback resistor. Input voltage Vin9 is input to Res41, and its inverted output is generated at the output of I913 with good linearity. CMOS inverters I921 to I923 in a three-stage array are connected to the output of I913 through coupling resistor CR91. The output of I923 is input to I921 through feedback resistor RF91 so the output of I913 is inverted again, and the output of Res41 reverts to a non-inverted state. CR91 and CR92 form a resistive coupling which contains the output of the first inverting amplifier and the output of the third resistor connected to the input signal.

Moreover, Vin9 is connected to I921 through coupling resistor CR92 and combined with the inverted output of I913. Assuming that the threshold voltage of CMOS inverter is Vb, Vout as the output of I923 is given in equation (23):

$$Vout9 - Vb = \frac{\frac{Res42}{Res41} \cdot \frac{1}{CR91} - \frac{1}{CR92}}{\frac{1}{RF91}}(Vin9 - Vb) \quad (23)$$

Equations (24) and (25) are adopted as the resistance ratio and the input voltage:

CR91=CR92=RF91 (24)

Vin9=V (25)

So formula (26) is obtained:

$$Vout9 - Vb = \left(\frac{Res42}{Res41} - 1\right)(V - Vb) \quad (26)$$

As shown in formula (26), the changes of Res42 and Res41 are detected by their own ratio. When contrary changes occur in them, the changed quantity can be detected by amplifying it twice. The gain can be adjusted according to the ratio when CR91≠CR92.

Like the above embodiments, oscillation is prevented by connecting grounded capacitors CG91 and CG92, balancing resistors RE911 and RE912, and RE921 and RE922.

In a sensor circuit according to the present invention, each of a pair of impedance is connected to the input of a CMOS inverting amplifier consisted of an odd number of inverters and to the midpoint of input and output. The structure gives closed loop-gain to the relationship between the input and output of this CMOS inverting amplifier according to the impedance changes. Alternatively, one of the pair of impedances is connected to a CMOS inserting amplifier consisted of an odd number of inverters with a feedback impedance, and that inverter's output and another impedance are added by a capacitive coupling. Therefore, both the circuit size and the electric power consumption can be reduced.

What is claimed is:

1. A sensor circuit for giving contrary characteristic changes to a first capacitor coupled to a first input signal and a second capacitor coupled to a second input signal, and electrically detecting said changes, said sensor circuit comprising:

i) a first inverting amplifier, said first inverting amplifier comprising an odd number of CMOS inverters connected to said first capacitor, and a first feedback capacitor, said first feedback capacitor connecting an output of said first inverting amplifier to an input of said first inverting amplifier;

ii) a second inverting amplifier, said second inverting amplifier comprising an odd number of CMOS inverters connected to said second capacitor, and a second feedback capacitor, said second feedback capacitor connecting an output of said second inverting amplifier to an input of said second inverting amplifier;

iii) a first intermediate capacitor connected to an output of said first inverting amplifier;

iv) a third inverting amplifier, said third inverting amplifier comprising an odd number of CMOS inverters connected to said first intermediate capacitor, and a third feedback capacitor, said third feedback capacitor connecting an output of said third inverting amplifier to an input of said third inverting amplifier;

v) a capacitive coupling which combines an output of said second inverting amplifier and an output of said third inverting amplifier; and vi) a fourth inverting amplifier, said fourth inverting amplifier comprising an odd number of CMOS inverters connected to an output of said capacitive coupling, and a fourth feedback capacitor, said fourth feedback capacitor connecting an output of said fourth inverting amplifier to an input of said fourth inverting amplifier.

2. A sensor circuit for detecting characteristic changes of a resistance value, said sensor circuit comprising:

i) a first inverting amplifier, said first inverting amplifier comprising an odd number of CMOS inverters connected to a first input signal through a first resistor, and a first feedback resistor, said first feedback resistor connecting an output of said first inverting amplifier to an input of said first inverting amplifier;

ii) a second inverting amplifier, said second inverting amplifier comprising an odd number of CMOS inverters connected to a second input signal through a second resistor, and a second feedback resistor, said second feedback resistor connecting an output of said second inverting amplifier to an input of said second inverting amplifier;

iii) a first intermediate resistor connected to an output of said first inverting amplifier;

iv) a third inverting amplifier, said third inverting amplifier comprising an odd number of CMOS inverters connected to said first intermediate resistor, and a third feedback resistor, said third feedback resistor connecting an output of said third inverting amplifier to an input of said third inverting amplifier;

v) a resistive coupling which combines an output of said second inverting amplifier and an output of said third inverting amplifier; and vi) a fourth inverting amplifier, said fourth inverting amplifier comprising an odd number of CMOS inverters connected to an output of said resistive coupling, and a fourth feedback resistor, said fourth feedback resistor connecting an output of said fourth inverting amplifier to an input of said fourth inverting amplifier.

3. A sensor circuit for detecting characteristic changes of a resistance value, said sensor circuit comprising:

i) a first inverting amplifier, said first inverting amplifier comprising an odd number of CMOS inverters, a first resistor connected between an input signal and an input of said first inverting amplifier, and a second resistor being connected between said input and an output of said first inverting amplifier;

ii) a resistive coupling which combines said output of said first inverting amplifier and said input signal; and iii) a second inverting amplifier, said second inverting amplifier comprising an odd number of CMOS inverters connected to an output of said resistive coupling, and a feedback resistor, said feedback resistor connecting an output of said second inverting amplifier to an input of said second inverting amplifier.

4. A sensor circuit comprising:

i) an inverting amplifier, said inverting amplifier comprising an odd number of CMOS inverters;

ii) a feedback capacitor, said feedback capacitor connecting an output of said inverting amplifier to an input of said inverting amplifier, wherein said feedback capacitor is a capacitive sensor;

iii) an input capacitor connected between an input signal and said input of said inverting amplifier;

iv) a reference capacitor connected to said inverting amplifier parallel to said input capacitor; and v) a switch for selectively connecting said reference capacitor and said input capacitor to said input of said inverting amplifier.

5. A sensor circuit comprising:

i) an inverting amplifier, said inverting amplifier comprising an odd number of CMOS inverters;

ii) a feedback capacitor, said feedback capacitor connecting an output of said inverting amplifier to an input of said inverting amplifier, wherein said feedback capacitor is a capacitive sensor;

iii) an input capacitor connected between an input signal and said input of said inverting amplifier;

iv) a reference capacitor connected to said inverting amplifier parallel to said feedback capacitor; and v) a switch for selectively connecting said reference capacitor and said feedback capacitor to said output of said inverting amplifier.

6. A sensor circuit comprising:

i) an inverting amplifier, said inverting amplifier comprising an odd number of CMOS inverters;

ii) a feedback capacitor, said feedback capacitor connecting an output of said inverting amplifier to an input of said inverting amplifier;

iii) an input capacitor connected between an input signal and said input of said inverting amplifier, wherein said input capacitor is a capacitive sensor;

iv) a reference capacitor connected between said input signal and said inverting amplifier parallel to said input capacitor; and v) a switch for selectively connecting said reference capacitor and said input capacitor to said input of said inverting amplifier.

7. A sensor circuit for detecting characteristic changes of a capacitive value, said sensor circuit comprising:

i) a first inverting amplifier, said first inverting amplifier comprising an odd number of CMOS inverters, a first capacitor connected between an input signal and an input of said first inverting amplifier, and a second capacitor being connected between said input and an output of said first inverting amplifier;

ii) a capacitive coupling which combines said output of said first inverting amplifier and said input signal; and iii) a second inverting amplifier, said second inverting amplifier comprising an odd number of CMOS inverters connected to an output of said capacitive coupling, and a feedback capacitor, said feedback capacitor connecting an output of said second inverting amplifier to an input of said second inverting amplifier.

* * * * *